United States Patent [19]

Fogelberg

[11] 4,281,749
[45] Aug. 4, 1981

[54] AUTOMATIC LOCKING CLUTCH

[75] Inventor: Mark J. Fogelberg, Muncie, Ind.

[73] Assignee: Borg-Warner Corporation, Chicago, Ill.

[21] Appl. No.: 27,347

[22] Filed: Apr. 5, 1979

Related U.S. Application Data

[63] Continuation-in-part of Ser. No. 868,587, Jan. 11, 1978, abandoned.

[51] Int. Cl.³ .................. F16D 11/00; B60K 17/34
[52] U.S. Cl. ..................... 192/36; 180/247; 192/49; 192/67 R; 192/93 A
[58] Field of Search .............. 192/35, 36, 49, 50, 192/67 R, 93 A; 180/247

[56] References Cited

U.S. PATENT DOCUMENTS

| 2,888,114 | 5/1959 | Bostock | 192/49 X |
| 3,217,847 | 11/1965 | Petrak | 192/93 A X |
| 3,651,906 | 3/1972 | Slator | 192/35 |
| 3,656,598 | 4/1972 | Goble | 192/35 |
| 4,163,486 | 8/1979 | Kagata | 192/67 R X |
| 4,192,411 | 3/1980 | Fogelberg | 192/49 |

Primary Examiner—Allan D. Herrmann
Attorney, Agent, or Firm—Julian Schachner

[57] ABSTRACT

A clutch for engaging a driving member with a driven member automatically upon application of torque to rotate the driving member in either direction, for maintaining engagement in either the drive or coast mode of operation and during the transition between drive and coast, for maintaining engagement in either forward or reverse operation and during the transition between forward and reverse, and for disengaging automatically upon interruption of the torque and slight relative rotation of the members. The clutch includes a mechanism for developing high frictional drag upon initial rotation of the driving member to effect engagement, and low frictional drag thereafter to conserve power. The clutch also includes a preloading mechanism so that if engagement should be blocked, it will be completed automatically when the blockage is relieved. The clutch further includes a mechanism tending to resist initial rotation of the driving member so that a false torque signal does not cause engagement.

51 Claims, 10 Drawing Figures

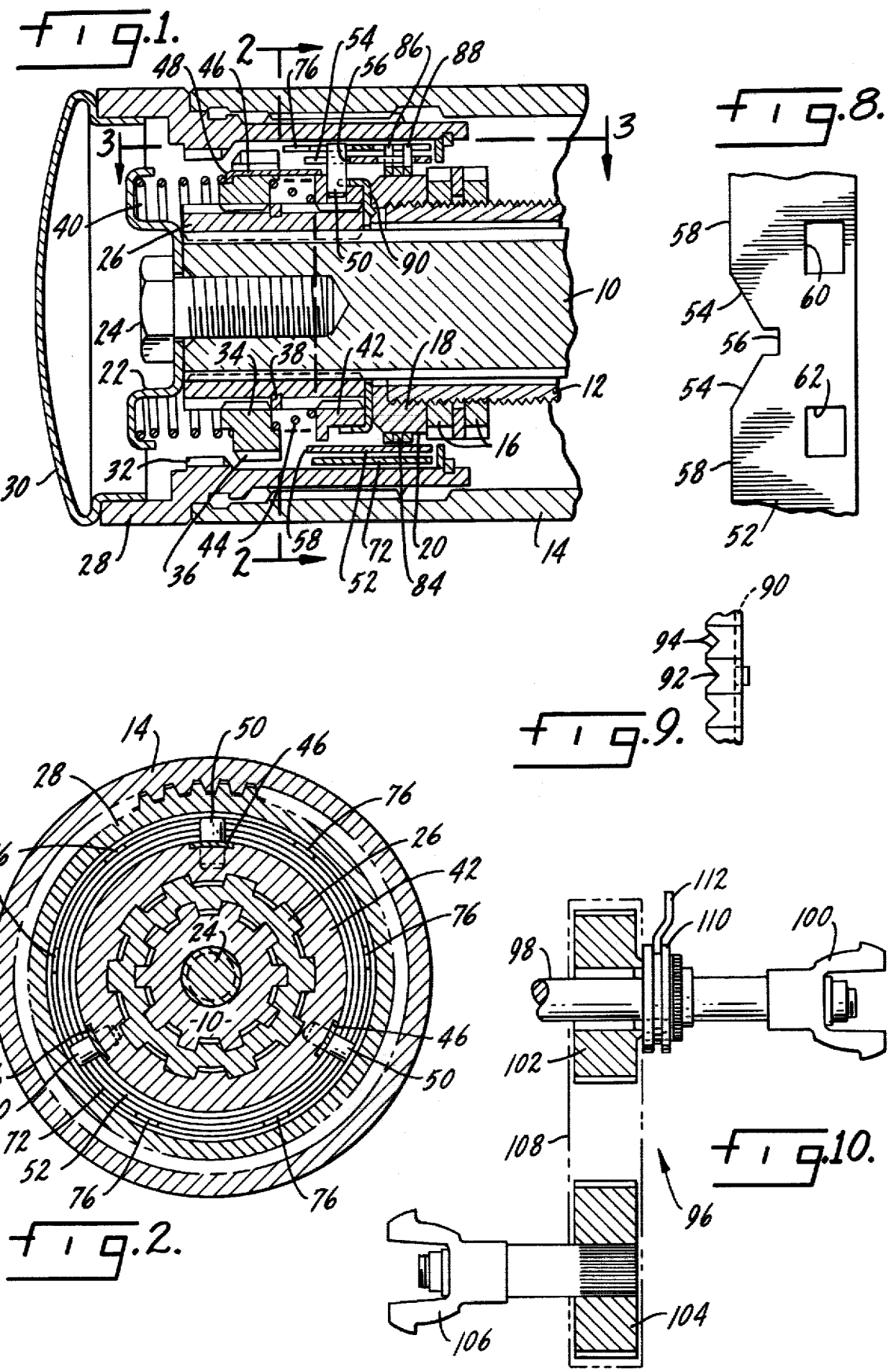

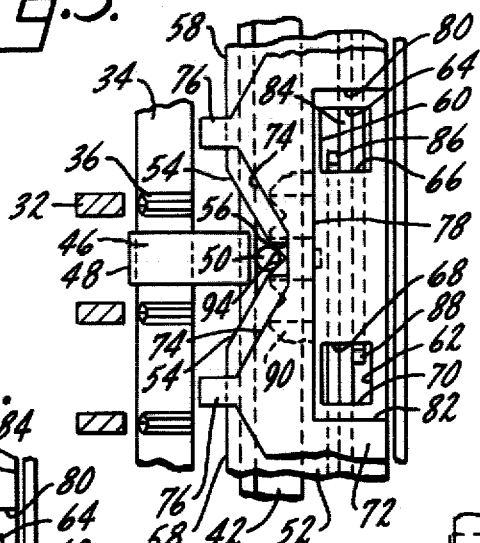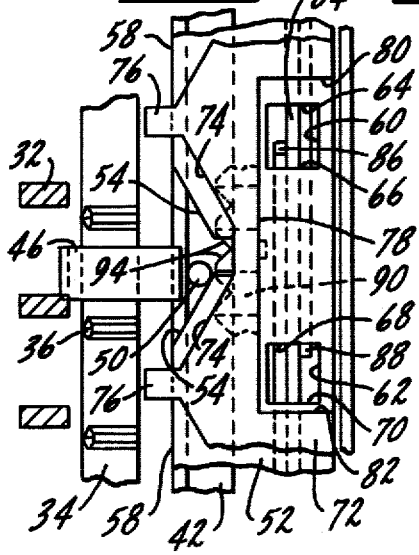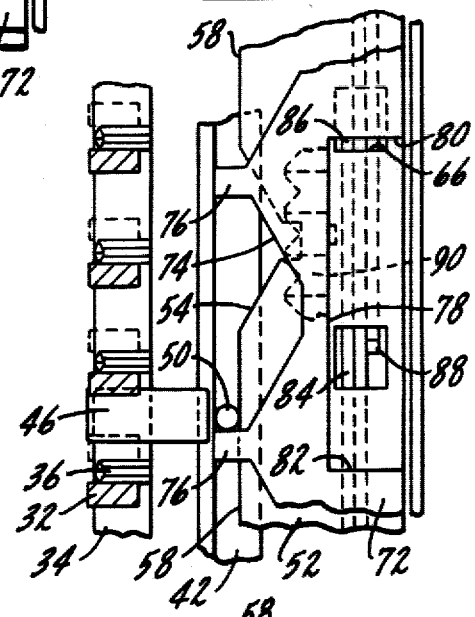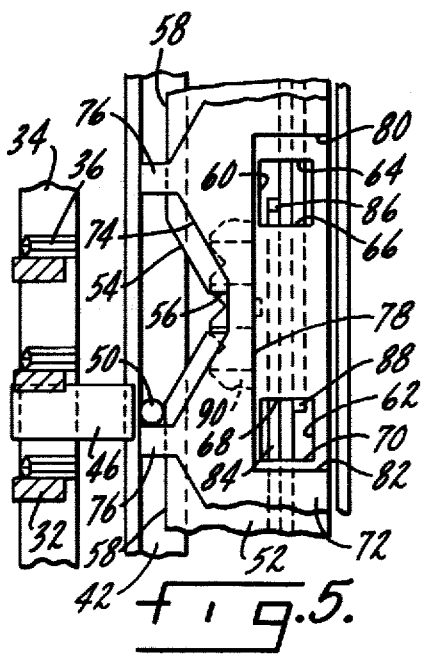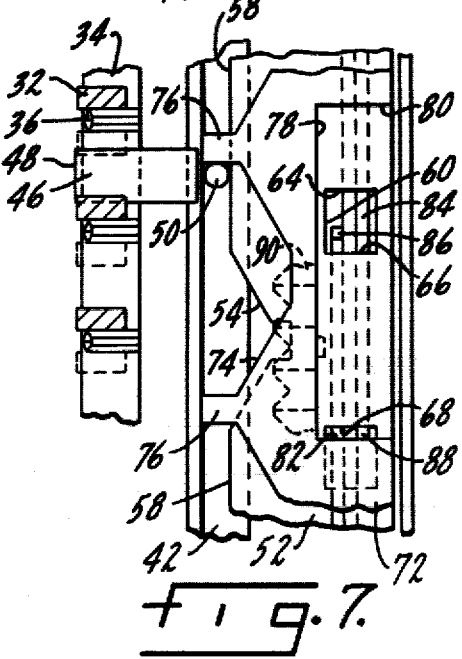

AUTOMATIC LOCKING CLUTCH

CROSS REFERENCE TO RELATED APPLICATION

This application is a continuation-in-part of U.S. Application Ser. No. 868,587 filed Jan. 11, 1978 now abandoned.

BACKGROUND OF THE INVENTION

This invention relates generally to clutches. More particularly, it relates to a clutch for use in effecting locking engagement between a drive axle and a wheel of a four-wheel drive vehicle upon the application of power to the drive axle. The clutch automatically effects disengagement upon cessation of the application of power to the drive axle, together with a direction reversal.

Heretofore, various mechanisms have been used for engaging a drive axle with its associated wheels in a four-wheel drive vehicle. One such mechanism in the form of a wheel hub normally is disengaged to allow the wheel to rotate independently of the axle. This requires that the operator lock a pair of hubs manually to engage the drive axle and wheels, and to unlock them manually to disengage.

Another such mechanism provides an overrunning clutch which engages automatically when power is applied to the drive axle and when operation is in the drive mode. However, such an overrunning clutch inherently disengages upon operation in the coast mode. In other words, the overrunning clutch engages when the rotational speed of the axle tends to exceed the rotational speed of the wheel, but disengages when the rotational speed of the wheel tends to exceed that of the axle. Such an overrunning clutch generally provides some means by which the operator may override manually to insure locking engagement between the axle and wheel.

Yet another such mechanism provides a clutch which operates in response to the application of power to the drive axle by moving pins into slots so as to engage the axle with its associated wheel. Although a mechanism of this type will effect engagement in either the drive or coast mode of operation, there is the possibility that the pins could slip out of the slots during movement between the drive and coast modes, in which case the clutch would disengage and then re-engage automatically. At normal operating speeds such disengagement and re-engagement could cause severe shocks to the clutch components and, indeed, to the entire driveline. This would result in a dangerous and possibly destructive condition. Further, in a float condition wherein the axle is rotating but no torque is transferred between the axle and wheels, an inadvertent tendency for movement between the drive and coast modes could develop. This also could cause the clutch to disengage and then re-engage, thus establishing the same dangerous condition.

U.S. Application Ser. No. 799,793 filed May 23, 1977 is directed to an automatic locking clutch which overcomes the deficiencies of the prior mechanisms. As disclosed therein, the clutch automatically engages a drive axle and an associated wheel upon engagement of a four-wheel drive system, maintains engagement positively in the drive and coast modes of operation as well as during the transition between drive and coast, maintains engagement positively in the forward and reverse modes of operation as well as during the transition between forward and reverse, and disengages automatically upon a slight direction reversal when the four-wheel drive system is disengaged.

A deficiency of this clutch is that it includes a ring which develops frictional drag sufficiently high to effect clutch engagement. Thereafter, this high drag continues even though it is not required to maintain clutch engagement. Thus, in order to conserve power, reduce heat, ease the problems of material selection, etc., there was still a need for an automatic locking clutch of this type which would develop relatively high frictional drag initially to effect automatic clutch engagement, and would develop relatively low frictional drag thereafter.

U.S. Application Ser. No. 868,587 filed Jan. 11, 1978 is directed to an automatic locking clutch which meets this need. This clutch includes a mechanism for developing frictional drag to effect clutch engagement. The mechanism incorporates a wrapped spring characterized as having relatively high resistance to slippage in the spring-tightening or wrapping direction, and relatively low resistance to slippage in the spring-loosening or unwrapping direction. Upon initial rotation of the driving member, the spring is caused to tighten, thereby effecting clutch engagement. Thereafter, the spring is caused to loosen, thereby reducing frictional drag to a minimum.

One problem with such an arrangement is that there may be times when movement toward clutch engagement is blocked or otherwise restrained. In such an event, rotation of the driving member causes the wrapped spring to tighten and develop relatively high frictional drag until clutch engagement is completed. It had been thought that this condition would obtain for only one revolution or less. It is known now that this condition could obtain for a much longer time, resulting in the development of excessive heat and even possible seizure of the wrapped spring.

Another problem is that there may be times when spurious rotation of the driving member could initiate clutch engagement. This might occur, for example, when a vehicle is operating in two-wheel drive during cold weather. Viscous drag within an associated transfer case could cause spurious rotation of the driving member, which spurious rotation could be sufficient to initiate the engaging sequence.

SUMMARY OF THE INVENTION

This invention is directed to an improved automatic locking clutch which will overcome the problems noted above. The invention is directed to an improved clutch for automatically effecting engagement between driving and driven members in response to rotation of the driving member. The clutch maintains positive engagement between the members so long as the driving member is subject to rotation, and disengages automatically upon slight relative rotation of the members when the driving member is no longer subject to rotation. The clutch of the present invention is adapted for use in four-wheel drive vehicles where it is desirable to provide automatic engagement of, for example, the front wheels when the operator shifts into four-wheel drive, and automatic disengagement when the operator shifts out of four-wheel drive and reverses direction slightly.

The clutch of this invention includes a movable clutching sleeve associated with a driving member and a fixed clutching sleeve associated with a driven member. The movable clutching sleeve is cammed into locking engagement with the fixed clutching sleeve upon rotation of the driving member. Disengagement is prevented even in the event of a tendency for the driven member to overrun the driving member. As a result, a positive locking relationship is maintained in the drive and coast modes of operation as well as during the transition between drive and coast. Furthermore, the arrangement is such that the relationship is maintained in the forward and reverse modes of operation as well as during the transition between forward and reverse.

The clutch of this invention also includes an improved mechanism for developing a frictional drag force to cause camming of the movable clutching sleeve. The mechanism incorporates a wrapped spring type of clutch characterized as having relatively high resistance to slippage in the spring-tightening or wrapping direction, and relatively low resistance to slippage in the spring-loosening or unwrapping direction. Upon initial rotation of the driving member, the spring is caused to tighten, thereby causing camming of the movable clutching sleeve. After camming is completed, the spring is caused to loosen, thereby reducing frictional drag to a minimum.

The movable clutching sleeve is subjected to a preload by the camming mechanism. Thus, in the event clutch engagement is blocked, the camming mechanism can complete its cycle of operation. When the blockage is relieved, the preloaded clutching sleeve completes clutch engagement.

A restraining device creates high resistance to movement of the movable clutching sleeve. This resistance is effective only during initial rotation of the driving member, thus negating the effect of any spurious force which might tend to rotate the driving member.

BRIEF DESCRIPTION OF THE DRAWINGS

The objects and advantages of this invention will become apparent to those skilled in the art upon careful consideration of the specification herein, including the drawings, wherein:

FIG. 1 is a sectional view showing details of the improved automatic locking clutch;

FIG. 2 is a sectional view taken along the line 2—2 of FIG. 1 showing additional details of the clutch;

FIG. 3 is a developed view taken along the line 3—3 of FIG. 1 showing the clutch in its disengaged position;

FIG. 4 is a developed view similar to FIG. 3 showing the clutch at an initial stage of movement toward its forward drive position;

FIG. 5 is a developed view similar to FIG. 3 showing the clutch at a later stage of movement toward its forward drive position;

FIG. 6 is a developed view similar to FIG. 3 showing the clutch in its forward drive position;

FIG. 7 is a developed view similar to FIG. 3 showing the clutch in its reverse drive position;

FIG. 8 is a detailed view showing a portion of the cam member;

FIG. 9 is a detailed view showing a portion of the detent member; and

FIG. 10 is a schematic view showing the associated transfer case for use in conjunction with the clutch.

While this invention is susceptible of embodiment in many different forms, there is shown in the drawings and herein will be described in detail a preferred embodiment. It should be understood that the present disclosure is considered to be an exemplification of the principles of the invention, and is not intended to limit the invention to this embodiment.

DESCRIPTION OF A PREFERRED EMBODIMENT

Referring to the drawings now in geater detail, and with particular reference to FIGS. 1, 2 and 3, there is shown a rotatable shaft 10, which in one form of the invention may be an axle of a four-wheel drive vehicle. Axle 10 is rotatably supported in a stationary member 12, which in one form of the invention may be a conventional axle housing. A rotatable member 14, which in one form of the invention may be a wheel hub of a four-wheel drive vehicle, is supported by a conventional bearing, not shown, for rotation about housing 12. Conventional lock nuts 16 secure this bearing in the usual manner. A sleeve 18, which may be an end nut or the like, is grounded by being secured to housing 12. Nut 18 defines a cylindrical surface 20, which preferably is slightly roughened.

Axle 10 extends outwardly beyond housing 12. A spring retainer 22 is secured to the outer end of axle 10 by a bolt 24 or the like. A driving member 26, which may be a collar or the like, is secured to axle 10 for rotation therewith, and is located between housing 12 and retainer 22.

A driven member 28, which may be a clutch sleeve or the like, is secured to wheel hub 14 for rotation therewith. Member 28 preferably extends outwardly beyond spring retainer 22 and bolt 24, so that a suitable cap 30 may close its outer end. Member 28 defines a set of clutch elements in the form of teeth 32.

A clutch member 34, which may be a clutch sleeve or the like, is splined to driving member 26 for rotation therewith and sliding movement relative thereto. Member 34 defines a set of clutch elements in the form of teeth 36. Member 34 is slidable between a first, inner position determined by a suitable retaining ring 38 in which clutch teeth 32, 36 are out of alignment and a second, outer position in which teeth 32, 36 are in alignment and are adapted for meshing engagement. A suitable return spring 40 biases member 34 inwardly toward its first position such that teeth 32, 36 normally are out of meshing engagement.

An actuating member 42 also is splined to driving member 26 for rotation therewith and sliding movement relative thereto. A load spring 44, which may be a conical spring or the like, is interposed between clutch member 34 and actuating member 42, and is subject to compression by outward sliding movement of member 42, thereby preloading member 34 and biasing it outwardly toward its second position. In a preferred form of the invention, the force of spring 40 is greater than that of spring 44.

Actuating member 42 includes a plurality of spaced fingers 46 extending outwardly through spaces provided between suitable adjacent teeth 36 of member 34. Fingers 46 define curved outer ends 48 which are located between member 34 and spring 40. Thus, spring 40 biases member 42 inwardly, as well as member 34. Member 42 also includes a plurality of spaced cam followers 50 in the form of pins or the like extending therefrom.

An annular cam member 52 is spaced from housing 12 and from member 42 so as to be rotatable relative thereto. Cam 52 defines a plurality of spaced pairs of outwardly diverging rise or ramp surfaces 54, with a notch 56 formed at their intersection. Cam 52 also defines a plurality of dwell or flat surfaces 58 connecting respective pair of surfaces 54. Further, cam 52 defines a pair of spaced slots 60 and 62 in alignment with surface 20 of nut 18. Slot 60 is partially defined by surfaces 64 and 66, and slot 62 by surfaces 68 and 70.

An annular stop member 72 is concentric with cam 52. Stop member 72 defines a plurality of pairs of outwardly diverging surfaces 74 parallel to but spaced farther apart then surfaces 54 of cam 52. Surfaces 74 terminate in projections 76 extending outwardly beyond surfaces 58 of cam 52 adjacent their junction with surfaces 54. Stop member 72 also defines a notch 78 in alignment with slots 60, 62 of cam 52 and surface 20 of nut 18. Notch 78 is partially defined by surfaces 80 and 82 such that notch 78 extends beyond slots 60, 62 with surfaces 80, 82 spaced farther apart than surfaces 64, 70.

A friction drag mechanism of the wrapped spring clutch type includes a multi-turn drag spring 84 wrapped around surface 20 of nut 18 with a slight interference fit so that some residual frictional drag force is developed therebetween. Spring 84 has ends 86 and 88 respectively extending radially through slots 60, 62 of cam 52 and into notch 78 of stop member 72. In the disengaged position shown in FIG. 3, spring ends 86, 88 are spaced from surfaces 66, 68 respectively.

A detent member 90, which may be a washer or the like, is grounded by being suitably secured to nut 18. Washer 90 has a plurality of spaced turned portions, each defining a notch 92 with a pair of diverging rise or ramp surfaces 94. The included angle formed by each pair of rise surfaces 94 is smaller than that formed by each pair of rise surfaces 54. Thus, surfaces 94 define steeper ramps than do surfaces 54.

In the disengaged position shown in FIG. 3, pins 50 are in notches 92 and 56; that is, on surfaces 94 and adjacent surfaces 54. Member 42 is in the position shown in FIG. 1. Teeth 32, 36 are out of alignment, and wheel hub 14 may rotate freely about axle 10, which is disengaged and thus not subject to powered rotation. The vehicle is in two-wheel drive.

With detent member 90 grounded, the steep slope of surfaces 94 provides relatively high resistance to rotation of member 42, and thus axle 10. In a preferred form of the invention, this resistance is sufficient to prevent spurious rotation of axle 10 under the influence of viscous drag or the like so long as the vehicle remains in two-wheel drive.

When the operator engages four-wheel drive, he subjects axle 10 to rotation under power. Members 26, 34 and 42 rotate with axle 10. Assuming that forward rotation of axle 10 results in downward movement of member 42, pins 50 ride up rise surfaces 94 of washer 90 and onto rise surfaces 54 of cam 52; that is, from the position shown in FIG. 3 to that shown in FIG. 4. Pins 50 drive cam 52 downwardly. Surface 68 of cam 52 abutts spring end 88 and drives spring 84 in a wrapping direction around surface 20 of nut 18. As spring 84 tightens, the frictional drag force tending to retard downward movement of cam 52 is increased, and a relatively high frictional drag results. Pins 50 ride up surfaces 54 to the position shown in FIG. 5, thereby sliding member 42 outwardly. Springs 40, 44 are compressed. Compression of spring 40 relieves its biasing force on member 34. Spring 44 causes member 34 to slide outwardly until teeth 36 are in alignment with teeth 32. Should this sliding movement of member 34 be blocked, compression of spring 44 preloads member 34. Slight relative rotation between teeth 32, 36 as pins 50 ride surfaces 58 downwardly to the position shown in FIG. 6 relieves this blockage, and the sliding movement of member 34 is completed. The biasing force of spring 40 again is applied to member 34.

Cam 52 no longer is driven by pins 50. However, pins 50 abut projections 76 and drive stop member 72 downwardly. Surface 80 of stop member 72 abuts spring end 86, driving it downwardly into abutment with surface 66 of cam 52. Spring end 88 is moved downwardly away from surface 68, and spring 84 loosens, or tends to unwrap around surface 20 of nut 18 as downward movement continues. The frictional drag force is decreased, with the result that there is very little energy loss, heat buildup, etc.

At this point teeth 36 are in alignment with teeth 32, and positive engagement is established between axle 10 and wheel hub 14 in the drive mode. Teeth 32, 36 are constructed such that the backlash therebetween is smaller than the distance between pins 50 and the junction of surfaces 54, 58 as shown in FIGS. 6 and 7.

When the vehicle shifts from drive to coast, as for example when the operator lifts his foot off of the accelerator, hub 14 tends to overrun axle 10. In this condition teeth 32 shift from the full-line position shown in FIG. 6 to the dotted-line position of FIG. 6. In effect, an engine braking condition is established, and hub 14 drives axle 10. Pins 50 continue to abut projections 76, and stop member 72 continues to drive cam 52 through spring end 86. Spring 84 continues to loosen, and frictional drag remains relatively low. The vehicle may shift back and forth between drive and coast, but teeth 32, 36 will remain in alignment, thus insuring that four-wheel drive operation is maintained.

When the operator desires to move in reverse, he stops the vehicle, shifts the transmission into reverse, and then starts the vehicle once again, all the while remaining engaged in four-wheel drive. Because the backlash between teeth 32, 36 is smaller than the distance between pins 50 and the top of ramp surfaces 54, tooth contact is established before pins 50 reach surfaces 54. Sufficient windup or tooth pressure between teeth 32, 36 is established such that sleeve 34 is held against the biasing force of spring 40 as pins 50 move from the position shown in FIG. 6 to the position shown in FIG. 7. Four-wheel drive operation is maintained. When in reverse, the vehicle may shift between the drive and coast modes while remaining positively engaged for four-wheel drive operation.

An important advantage of the arrangement disclosed herein is that a positive drive condition is maintained in both the drive and the coast modes, either in forward or reverse. This positive drive is established automatically, thereby eliminating any need for manually locking the wheel hubs.

When the operator desires to establish two-wheel drive, he stops the vehicle and disengages four-wheel drive. Axle 10 is no longer subject to rotation under power. The operator moves the vehicle in the opposite direction slightly to relieve the windup in teeth 32, 36 and to bring pins 50 into contact with ramp surfaces 54. Spring 40 biases members 34, 42 inwardly to the position shown in FIGS. 1 and 3. The operator may then proceed in either direction in two-wheel drive.

In a preferred form of the invention, direct drive may be established from an engine to, for example, a rear drive axle with auxiliary drive being established to a front drive axle. As shown in FIG. 10, such an arrangement may include a transfer case 96 having an input 98 adapted to receive power from the transmission of a four-wheel drive vehicle. A rear output 100 is connected directly to input 98, and is connected through a rear propeller shaft to the rear axle. A sprocket 102 is journalled for rotation relative to input 98, and a complimentary sprocket 104 is secured to a front output 106 which is connected through a front propeller shaft to axle 10. A suitable chain 108 couples sprockets 102, 104 for power transfer therebetween. A clutch 110 is controllable by the vehicle operator through a suitable actuating mechanism 112. In one position, clutch 110 disengages sprocket 102 from input 98 such that power is transferred from input 98 to output 100, but not to output 106. Two-wheel drive is established. Any spurious tendency for rotation of axle 10, for example due to viscous drag developed by lubricants within transfer case 96, does not develop sufficient torque to overcome the resistance offered to pins 50 by detent member 90. Similarly, the effect of wind, for example, on the front propeller shaft is negated. Inadvertent establishment of four-wheel drive is prevented.

In another position, clutch 110 engages sprocket 102 with input 98 such that power is transferred from input 98 to both outputs 100, 106. Axle 10 rotates, and four-wheel drive is established automatically.

Thus it will be seen that positive drive is established automatically when four-wheel drive is engaged. The automatic feature eliminates any necessity for manual lock-up in order to insure positive drive. Positive drive is maintained in either the drive or coast modes, and during the transition between drive and coast. Similarly, positive drive is maintained in either the forward or reverse modes, and during the transition between forward and reverse.

The clutch incorporates an actuating assembly which is constructed and arranged to develop a relatively high frictional drag force initially. This force is used to cam the clutch into engagement. The assembly subsequently develops a relatively low frictional drag force. The assembly completes its actuating cycle, effecting clutch engagement or, if engagement is blocked, preloading the clutch for engagement when the blockage is removed. The assembly prevents inadvertent clutch engagement due to spurious forces which may tend to rotate the axle, and effects automatic clutch engagement when the axle is connected in the driveline for rotation under power.

It is apparent that although the invention provides a novel arrangement for clutching the drive axle and its associated wheels in a four-wheel drive vehicle, it is readily available for use in any environment where automatic clutching between driving and driven members is desired.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. In a clutch for effecting engagement between rotatable driving and driven members in response to rotation of the driving member, said clutch incorporating first and second clutching means respectively rotatable with said driving and driven members, said first clutching means being movable relative to said driving member into and out of engagement with said second clutching means, means yieldably biasing said first clutching means away from engagement with said second clutching means, and actuating means for said clutch; the improvement wherein said actuating means comprises rotatable cam means, means responsive to rotation of said driving member for developing a relatively high force tending to retard rotation of said cam means when said clutching means are out of engagement and a relatively low force tending to retard rotation of said cam means when said clutching means are in engagement, means for rotating said cam means in opposition to said relatively high force and moving said first clutching means toward engagement with said second clutching means in response thereto, and means for rotating said cam means in opposition to said relatively low force.

2. The invention of claim 1, said rotating and moving means including cam follower means rotatable with said driving member, said cam follower means being cooperable with said cam means for movement relative to said driving member, and resilient means coupling said cam follower means with said first clutching means, said resilient means loading said first clutching means for movement toward engagement with said second clutching means in response to said movement of said cam follower means.

3. The invention of claim 2, said cam follower means being cooperable with said biasing means for relieving the biasing force thereof on said first clutching means when said first clutching means is loaded by said resilient means.

4. The invention of claim 3, wherein said actuating means further comprises means tending to retard initial rotation of said driving member.

5. An automatic clutch disposed for selective engagement of a first member with a second member upon rotation of the first member, said clutch comprising first clutch means secured to the first member for rotation therewith and movement relative thereto, said first clutch means defining a first set of clutch teeth, second clutch means secured to the second member for rotation therewith, said second clutch means defining a second set of clutch teeth, said first and second sets of clutch teeth being adapted for meshing engagement in drive and coast modes when in alignment, means biasing said first clutch means for movement away from said second clutch means such that said first and second sets of clutch teeth are out of alignment, a cam rotatable upon rotation of said first clutch means, and means tending to retard rotation of said cam, said first clutch means being movable toward said second clutch means in response to retarded rotation of said cam such that said first set of clutch teeth are in alignment with said second set of clutch teeth, said rotation retarding means being constructed and arranged such that its rotation retarding tendency is relieved after said movement of said first clutch means.

6. The invention of claim 5, said cam being rotatable with said first clutch means as said clutch teeth move between meshing engagement in the drive mode and meshing engagement in the coast mode.

7. The invention of claim 6, said first clutch means being rotatable relative to said cam for a predetermined distance in response to a reversal of the direction of rotation of the first member, said cam being rotatable upon rotation of said first clutch means in the reverse direction thereafter.

8. The invention of claim 7, said clutch teeth when in meshing engagement tending to develop sufficient force to overcome the force of said biasing means and prevent movement of said first clutch means away from said second clutch means.

9. A clutch for automatically engaging and disengaging first and second members rotatable relative to a housing, said clutch comprising first and second clutch members respectively rotatable with said first and second rotatable members, said first and second clutch members being adapted for engagement in drive and coast modes, a rotatable cam, said cam defining a rise surface and a dwell surface, a rotatable stop member, means contiguous to said housing and movable relative thereto for developing drag, said drag means being movable by said cam to thereby develop relatively high drag and movable by said stop member to thereby develop relatively low drag, means biasing said first and second clutch members away from engagement, and a cam follower rotatable with the first rotatable member and coupled with said first clutch member, rotation of the first rotatable member causing said cam to rotate thereby moving said drag means and causing said cam follower to move up said rise surface onto said dwell surface such that said first and second clutch members are biased toward engagement, said stop member being engageable by said cam follower for rotation thereof when said cam follower is on said dwell surface, rotation of said stop member moving said drag means.

10. The invention of claim 9, said clutch further comprising means tending to resist initial movement of said cam follower up said rise surface.

11. The invention of claim 10, said resisting means defining another rise surface, the slope of said other rise surface being steeper than the slope of said rise surface, said cam follower being movable up said other rise surface onto said rise surface.

12. The invention of claim 9, 10 or 11, said cam follower being coupled with said first clutch member by resilient means, movement of said cam follower up said rise surface loading said resilient means and thereby biasing said first and second clutch members toward engagement.

13. The invention of claim 12, said cam follower being cooperable with said biasing means for relieving the biasing force thereof when said resilient means is loaded.

14. A clutch for automatically engaging and disengaging a drive member and a driven member wherein the drive member is rotatable relative to a housing, said clutch comprising a first clutch member disposed for rotation with and movement relative to the drive member, a second clutch member rotatable with the driven member, said first and second clutch members being adapted for engagement when in alignment, resilient means biasing said first clutch member for movement away from alignment with said second clutch member, a rotatable cam member, said cam member defining rise and dwell surfaces, a rotatable stop member, spring means wrapped relative to said housing for developing frictional drag, said spring means being engageable by said cam member and rotatable thereby in a wrapping direction tending to tighten said spring means and thereby develop a relatively high frictional drag force tending to retard rotation of said cam member, said spring means being engageable by said stop member and rotatable thereby in an unwrapping direction tending to loosen said spring means and thereby develop a relatively low frictional drag force tending to retard rotation of said stop member, a cam follower member disposed for rotation with and movement relative to the drive member, rotation of the drive member causing said cam follower member to engage said cam member and drive said cam member into engagement with said spring means for rotation thereof in said wrapping direction, retarded rotation of said cam member causing said cam follower member to ride up said rise surface onto said dwell surface and out of rotatable engagement with said cam member thereby moving said first clutch member into alignment with said second clutch member, said cam follower member being engageable with said stop member when on said dwell surface for driving said stop member into engagement with said spring means for rotation thereof in said unwrapping direction, said cam member being engageable and driveable by said spring means upon rotation thereof in said unwrapping direction for rotation of said cam member with said spring means and said stop member.

15. The invention of claim 14, said first and second clutch members respectively defining first and second sets of clutch teeth adapted for meshing engagement when said clutch members are in alignment, said clutch teeth having a backlash when in meshing engagement sufficient to maintain said cam follower member on said dwell surface, said clutch teeth developing sufficient windup when in meshing engagement to negate the biasing force of said resilient means.

16. The invention of claim 15, further comprising means tending to resist spurious rotation of the drive member.

17. The invention of claim 16, said spurious rotation resisting means being secured to said housing.

18. The invention of claim 16, said spurious rotation resisting means defining another rise surface, said other rise surface being steeper than said rise surface, rotation of the drive member causing said cam follower member to ride up said other rise surface onto said rise surface.

19. The invention of claim 17, said spurious rotation resisting means defining another rise surface, said other rise surface being steeper than said rise surface, rotation of the drive member causing said cam follower member to ride up said other rise surface onto said rise surface.

20. The invention of claim 14, further comprising means tending to resist spurious rotation of the drive member.

21. The invention of claim 20, said spurious rotation resisting means being secured to said housing.

22. The invention of claim 21, said spurious rotation resisting means defining another rise surface, said other rise surface being steeper than said rise surface, rotation of the drive member causing said cam follower member to ride up said other rise surface onto said rise surface.

23. The invention of claim 22, 16, 17, 18 or 19, further comprising other resilient means coupling said cam follower member with said first clutch member, said cam follower member loading said other resilient means as it rides up said rise surface thereby biasing said first clutch member for movement toward alignment with said second clutch member.

24. The invention of claim 23, said resilient means being a biasing spring, and said other resilient means being a coupling spring interposed between said cam follower member and said first clutch means, said cam follower member compressing said coupling spring and said biasing spring as it rides up said rise surface thereby loading said coupling spring and negating the biasing force of said biasing spring until said first clutch member is in alignment with said second clutch member.

25. The invention of claim 20, said spurious rotation resisting means defining another rise surface, said other rise surface being steeper than said rise surface, rotation of the drive member causing said cam follower member to ride up said other rise surface onto said rise surface.

26. The invention of claim 14, 15, 20, 21 or 25, further comprising other resilient means coupling said cam follower member with said first clutch member, said cam follower member loading said other resilient means as it rides up said rise surface thereby biasing said first clutch member for movement toward alignment with said second clutch member.

27. The invention of claim 26, said resilient means being a biasing spring, and said other resilient means being a coupling spring interposed between said cam follower member and said first clutch means, said cam follower member compressing said coupling spring and said biasing spring as it rides up said rise surface thereby loading said coupling spring and negating the biasing force of said first biasing spring until said first clutch member is in alignment with said second clutch member.

28. A clutch for automatically engaging and disengaging rotatable drive and driven members wherein the drive member is supported for rotation relative to a stationary member, said clutch comprising first clutch means rotatable with and movable relative to the drive member, second clutch means rotatable with the driven member, said first and second clutch means being engageable when in alignment, annular cam means concentric with the drive member, said cam means defining a plurality of rise and dwell surfaces, said cam means also defining first and second slots, annular stop means concentric with said cam means, said stop means defining a plurality of projections extending beyond said dwell surfaces of said cam means, said stop means also defining a notch, cam follower means rotatable with and movable relative to the drive member, said cam follower means disposed to ride said rise and dwell surfaces of said cam means for camming movement of said first clutch means toward alignment with said second clutch means, first spring means biasing said first clutch means away from alignment with said second clutch means, and second spring means wrapped contiguous to the stationary member, said second spring means having first and second end portions extending respectively through said first and second slots and into said notch.

29. The invention of claim 28, said first slot being at least partially defined by a plurality of first slot surfaces of said cam means, said second slot being at least partially defined by a plurality of second slot surfaces of said cam means, and said notch being at least partially defined by a plurality of notch surfaces of said stop means, rotation of the drive member in one direction causing said cam follower means to rotate said cam means in said one direction, said second spring means being wrapped contiguous to said stationary member such that rotation of said cam means in said one direction causes one of said first slot surfaces to abut said first end portion and rotate said second spring means in said one direction to thereby tighten said wrapping thereof and develop a relatively high friction drag tending to retard continued rotation of said cam means, retarded rotation of said cam means causing said cam follower means to ride up at least one of said rise surfaces and onto at least one of said dwell surfaces such that said first clutch means is cammed toward alignment with said second clutch means and such that said cam follower means ceases to rotate said cam means and abuts at least one of said projections so as to rotate said stop means in said one direction, rotation of said stop means in said one direction causing one of said notch surfaces to abut said second end portion and rotate said second spring means in said one direction to thereby loosen said wrapping thereof and develop a relatively low friction drag tending to retard continued rotation of said stop means, said rotation of said second spring means by said one notch surface causing said second end portion to abut one of said second slot surfaces and rotate said cam means in said one direction.

30. The invention of claim 29, further comprising means tending to resist spurious rotation of said cam follower means.

31. The invention of claim 29, said first and second clutch means respectively defining first and second sets of clutch teeth adapted for meshing engagement in drive and coast modes when said first and second clutch means are in alignment, said first and second clutch means being rotatable relatively between said drive and coast modes when said cam follower means is on said one dwell surface of said cam means.

32. The invention of claim 3, further comprising means tending to resist spurious rotation of said cam follower means.

33. The invention of claim 31, rotation of said first clutch means in the opposite direction when said first and second clutch means are in alignment developing sufficient windup in said first and second sets of clutch teeth to nullify the biasing force of said first spring means.

34. The invention of claim 33, further comprising means tending to resist spurious rotation of said cam follower means.

35. The invention of claim 28, 29, 31 or 33, said first clutch means and said cam follower means being separately movable relative to the drive member, and third spring means coupling said first clutch means with said cam follower means, riding of said cam follower means up said one rise surface compressing said third spring means thereby biasing said first clutch means toward alignment with said second clutch means.

36. The invention of claim 35, further comprising means tending to resist spurious rotation of said cam follower means.

37. The invention of claim 35, riding of said cam follower means up said one rise surface also compressing said first spring means thereby negating its biasing effect on said first clutch means until said first clutch means is in alignment with said second clutch means.

38. The invention of claim 37, further comprising means tending to resist spurious rotation of said cam follower means.

39. The invention of claims 28, further comprising means tending to resist spurious rotation of said cam follower means.

40. Apparatus comprising a rotatable member, a rotatable cam, a rotatable stop, a cam follower rotatable upon rotation of said member, said cam follower being movable between first and second positions, and means biasing said cam follower toward its first position, relative rotation between said cam and cam follower effecting movement of said cam follower toward its second position, drag inducing means movable to high and low drag inducing modes, said cam follower when in its first position rotating said cam upon rotation of said member, said cam upon rotation thereof moving said drag inducing means to its high drag inducing mode thereby effecting said relative rotation between said cam and cam follower, said cam follower when in its second position rotating said stop upon rotation of said member, said stop upon rotation thereof moving said drag inducing means to its low drag inducing mode and rotating said cam with said cam follower.

41. The invention of claim 40, further comprising means tending to resist spurious rotation of said member.

42. An automatic clutch comprising first and second rotatable members, first and second clutch elements respectively rotatable with said first and second members, said elements being engageable in drive and coast modes when in alignment, said first element being slidable relative to said first member between a first position out of alignment with said second element and a second position in alignment with said second element, first means responsive to rotative force above a predetermined threshold applied to said first member in one direction for sliding said first element to said second position and for maintaining said first element in said second position irrespective of the mode in which said elements are engaged, and second means effective when said elements are not engaged and said first member is not subject to said rotative force for sliding said first element to said first position.

43. The invention of claim 42, said elements when in alignment being rotatable relatively between engagement in said drive and coast modes, said first means being effective when said first member is subject to said rotative force for maintaining said first element in said second position irrespective of the relative rotation of said elements.

44. The invention of claim 43, sid elements being effective as the direction of said rotative force is changed from said one direction to the opposite direction for maintaining said first element in said second position, said first means thereafter being effective when said first member is subject to said rotative force in said opposite direction for maintaining said first element in said second position irrespective of the relative rotation of said elements.

45. The invention of claim 42, 43 or 44, said first means including means for biasing said first element for sliding to said second position.

46. Apparatus comprising first and second rotatable members engageable when in alignment, said first member being movable between a first position out of alignment with said second member and a second position in alignment with said second member, means biasing said first member for movement toward its first position, and actuating means operative for biasing said first member for movement toward its second position and for negating the biasing effect of said resilient means until said first member is in its second position.

47. The invention of claim 46, said biasing means including a first spring acting upon said first member through said actuating means, and said actuating means including a second spring acting upon said first member in opposition to said first spring.

48. The invention of claim 47, said first and second members respectively including first and second sets of teeth adapted for meshing engagement when said members are in alignment, said actuating means upon operation thereof compressing said second spring thereby biasing said first member for movement toward its second position, said actuating means upon operation thereof also compressing said first spring thereby moving said first spring to a position in which it acts upon said first member when said first member is in its second position.

49. Apparatus comprising means defining a notch, a rotatable member, a rotatable cam defining a rise surface and a dwell surface, means tending to retard rotation of said cam, a cam follower rotatable with and movable relative to said member, and means biasing said cam follower toward said notch, initial rotation of said member being effective to drive said cam follower out of said notch onto said rise surface, subsequent rotation of said member being effective to rotate said cam and drive said cam follower off of said rise surface onto said dwell surface.

50. The invention of claim 49, further comprising a rotatable stop, further rotation of said member being effective to rotate said stop, rotation of said stop being effective to rotate said cam with said cam follower thereby maintaining said cam follower on said dwell surface.

51. The invention of claim 50, rotation of said stop also being effective to reduce the tendency of said rotation retarding means to retard rotation of said cam.

* * * * *